ized by:

(12) United States Patent
Chourasia et al.

(10) Patent No.: US 11,082,315 B1
(45) Date of Patent: Aug. 3, 2021

(54) METHOD OF SUB FLOW OR ACTIVITY CLASSIFICATION (71) Applicant: QUALCOMM Incorporated, San Diego, CA (US)

(72) Inventors: Ajit Chourasia, San Diego, CA (US); Jaikanth Krishnaswamy, San Diego, CA (US); Rasjinder Singh, San Diego, CA (US); Vijaya Datta Mayyuri, San Diego, CA (US); Ken Takasaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/121,050

(22) Filed: Dec. 14, 2020

(51) Int. Cl.
*H04L 29/08* (2006.01)
*H04L 12/26* (2006.01)
*H04L 12/24* (2006.01)
*H04L 12/18* (2006.01)
*H04M 3/53* (2006.01)
*H04M 3/42* (2006.01)

(52) U.S. Cl.
CPC ...... *H04L 43/0817* (2013.01); *H04L 12/1813* (2013.01); *H04L 29/08099* (2013.01); *H04L 41/026* (2013.01); *H04L 41/083* (2013.01); *H04L 43/0882* (2013.01); *H04L 43/0888* (2013.01); *H04M 3/42382* (2013.01); *H04M 3/5322* (2013.01)

(58) Field of Classification Search
CPC ............... H04L 41/083; H04L 43/0817; H04L 43/0882; H04L 43/0888; H04L 67/104; G06F 11/1471; G06F 16/23; G06F 16/254; G06F 16/683; G06F 21/6227; G06F 21/64; G06F 3/017; G06F 8/61; G06F 9/451; G06F 9/468; G06Q 10/0633
See application file for complete search history.

(56) References Cited

U.S. PATENT DOCUMENTS

| | | | |
|---|---|---|---|
| 9,367,681 B1 | 6/2016 | Ismael et al. | |
| 9,684,787 B2 | 6/2017 | Sridhara et al. | |
| 9,916,442 B2 | 3/2018 | Lindo et al. | |
| 10,148,667 B2 | 12/2018 | Padidar et al. | |
| 10,452,840 B2 | 10/2019 | Chen et al. | |
| 2011/0161333 A1* | 6/2011 | Langseth | G06F 16/254 707/755 |
| 2012/0036049 A1* | 2/2012 | Gerzymisch | G06F 8/61 705/29 |
| 2015/0020075 A1* | 1/2015 | Glew | G06F 9/468 718/101 |

(Continued)

*Primary Examiner* — Le H Luu
(74) *Attorney, Agent, or Firm* — The Marbury Law Group, PLLC (57) ABSTRACT

Methods, and mobile devices implementing the methods, identify the types of activities performed by a software application operating on a computing device, and take responsive actions based on the detected activity types. For example, the computing device may determine an application type of the software based on metadata associated with the software application, select a lookup table based on the determined application type, determining the types of activities performed by the software application based on the selected lookup table, and select, determine or performing a responsive action based on the types of activities performed by the software application on the computing device.

25 Claims, 7 Drawing Sheets

(56) References Cited

U.S. PATENT DOCUMENTS

| | | | |
|---|---|---|---|
| 2015/0100578 A1* | 4/2015 | Rosen | G06F 16/23 707/737 |
| 2015/0286715 A1* | 10/2015 | Barraclough | G06F 16/683 707/769 |
| 2015/0286969 A1* | 10/2015 | Warner | G06Q 10/0633 705/7.27 |
| 2016/0170496 A1* | 6/2016 | James | G06F 3/017 345/156 |
| 2016/0283083 A1* | 9/2016 | Fu | G06F 9/451 |
| 2019/0222560 A1* | 7/2019 | Ford | G06F 21/64 |
| 2019/0354713 A1* | 11/2019 | Surla | G06F 21/6227 |
| 2020/0250295 A1* | 8/2020 | Padmanabhan | H04L 67/104 |
| 2021/0019333 A1* | 1/2021 | Attarde | G06F 11/1471 |

* cited by examiner

| 216 | Text 280 | VOIP 282 | Video 284 | Photo Sharing 286 | Position Sharing 288 | Games 290 | ... |
|---|---|---|---|---|---|---|---|
| Speaker 252 | 0 | 1 | 1 | 0 | 0 | 1 | |
| Microphone 254 | 0 | 1 | 1 | 0 | 0 | 0 | |
| SOC Hardware Block Usage 256 | 0 | 0 | 1 | 0 | 0 | 0 | |
| CPU 258 | 0 | DL/UL | DL/UL | DL/UL | 0 | DL/UL | |
| GPU 260 | 0 | 0 | 0 | 0 | 0 | 1 | |
| SOC Temp 262 | 0 | 0 | 0 | 0 | 0 | 1 | |
| GPS 264 | 0 | 0 | 0 | 0 | 1 | - | |
| Front Camera 266 | 0 | 0 | 1 | 0 | 0 | 0 | |
| Rear Camera 268 | 0 | 0 | 0 | 0 | 0 | 0 | |
| Display Orientation 270 | 0 | 0 | 0 | 0 | 0 | 1 | |
| Display Touch 272 | 1 | 0 | 0 | 1 | 0 | 1 | |
| ... | | | | | | | |

METHOD OF SUB FLOW OR ACTIVITY CLASSIFICATION

BACKGROUND

Cellular and wireless communication technologies have seen explosive growth over the past several years. This growth has been fueled by better communications, hardware, larger networks, and more reliable protocols. As a result, wireless service providers are now able to offer their customers with unprecedented levels of access to information, resources, and communications.

To keep pace with these service enhancements, mobile electronic devices (e.g., cellular phones, tablets, laptops, etc.) have become more powerful and complex than ever. Due to this complexity, it is challenging to determine, analyze or evaluate the current state of the mobile device or its software applications. This in turn makes it challenging to dynamically allocate resources and adjust device settings and parameters consistent with the current state or executing functionality of the software application.

SUMMARY

Various embodiments include methods for determining types of activities performed by a software application on a computing device, which may include determining an application type of the software application prior to executing the software application on the computing device based on metadata associated with the software application, selecting a lookup table based on the determined application type, using the selected lookup table at runtime to determine activities or types of activities of the executing software application correlated to currently activated device resources, and performing a responsive action based on the determined activities or types of activities.

In some aspects, selecting the lookup table based on the determined application type may include selecting a table that maps or correlates at least one of a function, resource or sensor value to at least one functional activity of the software application. In some aspects, selecting the lookup table based on the statically determined application type may include selecting an application-specific table that maps or correlates at least one of a function, resource or sensor value to at least one functional activity of a specific software application. In some aspects, selecting the lookup table based on the statically determined application type may include selecting an application-specific table that maps or correlates at least one of a function, resource or sensor value to at least one functional activity of a specific type of software application.

In some aspects, determining the software application type of the software application prior to executing the software application on the computing device based on metadata associated with the software application may include statically determining the software application type based on metadata received from an application download service.

In some aspects, using the selected lookup table at runtime to determine the activity or types of activities of the executing software application correlated to currently activated device resources may include continuously or repeatedly monitoring computing device resources activated or in use by the software application, and dynamically determining the activity or types of activities of the executing software application by continuously or repeatedly applying the computing device resources activated or in use by the software application to the selected lookup table to identify the activity or types of activities correlated to the activated computing device resources. In some aspects, continuously or repeatedly monitoring computing device resources activated or in use by the software application may include continuously or repeatedly monitoring one or more of network usage, activated sensors, activated display functions, user interface device usage, speaker activation, microphone activation, central processor unit activity, graphics processor activity, or software usage information.

In some aspects, performing a responsive action based on the determined activity or types of activities may include one or more of selecting a low latency link, preforming network optimizations, selecting a network slice, or performing application fencing.

Some aspects may include a computing device (e.g., a mobile device) having a memory storing processor-executable instructions and a processor configured to execute the processor-executable instructions configured to perform operations of any of the methods summarized above. Some aspects may include a processor for use in a computing device, the processor having memory and configured to perform operations of any of the methods summarized above. Some aspects may include a computing device having various means for performing functions of any of the methods summarized above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, various embodiments included methods, and computing devices configured to implement the methods, for identifying the type of activity that a software application operating on a computing device is performing from moment to moment. For example, a computing device processor may be configured to use a lookup table appropriate for an executing application (or an application-specific lookup table) to identify a current activity of the software application. The computing device processor may identify the current activity by using information regarding active resources and sensor values as look-up table inputs.

In some embodiments, when a software application is downloaded, installed or launched on the computing device, the computing device processor may use metadata associated with the software application to determine the specific application (e.g., WhatsApp®, WeChat, etc.) or type of application (e.g., social media app, communication app, etc.) being launched. Using the determination of the application or application type, the computing device may select an application-specific lookup table for use in determining current activities or types of activities being performed by the software application during runtime. The application-specific lookup table may include information that maps or correlates various functions, resources and/or sensor values to particular functional activities of the application, such as functionalities that the particular application is capable of performing. The computing device may use the selected application-specific lookup table to determine the dynamic activities of the application, and perform a responsive action based on the determined dynamic activities. Examples of responsive actions include selecting a low latency link, preforming network optimizations, selecting a network slice, performing application fencing for GPS/navigation, etc.

As an example, when WhatsApp® software application is launched on a computing device configured in accordance with the embodiments, the computing device may use metadata associated with the launched application to determine that a social media application is starting. Based on this determination, a processor of the computing device may select a lookup table generated for social media applications. The selected lookup table may relate or correlate various resources, functions and sensors to the kinds of activities that social media applications perform, such as texting/chat, VOIP, video conferencing, streaming media, sharing photos, live sharing and games. The selected lookup table may also relate certain functions to each of the activities (e.g., texting, VOIP, video conferencing, etc.). For example, the computing device may reference the lookup table and determine that the social media application is conducting a VOIP call in response to detecting that the microphone and speaker of the computing device are on, the central processing unit (CPU) or graphics processing unit (GPU) resources of the device are being used, and an associated communication link is experiencing frequent upload and download of data packets. The computing device may reference the lookup table and determine that the application is engaged texting activities in response to detecting that the microphone and speaker are off, the display is on, and there has been recent keyboard activity. The computing device may select a low latency link in response to determining that a VOIP call is active, but not if the application is engaged texting activities.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "network function virtualization (NFV)" may be used in this application to refer to components, systems and technologies that leverage virtualization techniques to enable existing network infrastructure (both user and control plane) to be consolidated and virtualized so that it may operate in a virtualized environment on commodity hardware.

The term "network slicing" may be used in this application to refer to a type of virtual networking architecture in the same family as network functions virtualization (NFV) that allows for the creation of multiple virtual networks ("network slices") atop the shared physical infrastructure, commodity hardware or infrastructure as a service (IaaS) via the partitioning of network architectures into virtual elements. As an example, a mobile device may determine an identity of the network (e.g., a Public Land Mobile Network (PLMN) or another suitable network) with which the mobile device is in communication, and scan the characteristics of one or more connectivity objects that are linked in a server object based on the determined network identity. The connectivity objects may include a single network slice selection assistance information (S-NSSAI) information element (IE) that identifies a 5G standalone (SA) mode. Example SA modes include enhanced mobile broadband (eMBB), ultra-reliable low latency communications (URLLC), massive IOT (mIoT), custom, etc.).

In order to access network slices in a 5G New Radio (NR) network, the mobile device may first perform a registration request procedure in which it provides a requested network slice selection assistance information (NSSAI) message to a core access and mobility management function (AMF) component in the network. In response to receiving the requested NSSAI message, the AMF component may perform various authentication operations, which may include performing certain checks based on local policies, the mobile device's subscriptions, information stored in the mobile device's subscriber identity module (SIM) card, etc., and verifying the network slices that can be provided to the mobile device (e.g., provisioned for access and use by the mobile device). If these operations are successful, the AMF component may generate and send an Allowed NSSAI message to the mobile device that informs the mobile device of the verified network slices that the mobile device may access and use. In response to receiving the Allowed NSSAI message, the mobile device may perform various protocol/packet data unit (PDU) session establishment operations to establish a connectivity to the network slices.

The term "inference" is used in this application to refer to a correlation of data points that may be used to determine the current state of a computing device or software application operating on the computing device. Inferences may identify the type of software application that is executing/operating on the computing device. Inferences may also identify the current state and actions being executed/performed by the software application. Examples of such "inferences" include "video playback," "audio playback," "VOIP," "video call," "navigation motion," "game phases" (e.g., update, game play/game launch/advertisement), "data upload", and "data download."

In some embodiments, a computing device may be configured to use a combination of static and dynamic classifications to determine the types of activities performed by a software application. The computing device may be configured to perform static classification operations (e.g., at install, etc.) based on static information, such as metadata, to generate static classifications. The static classification may include course classifications, such as the classification of an application as a browser, game, social, navigation, multi, etc. In some embodiments, the computing device may classify the application as "multi" in response to determining that the application could be classified into multiple different categories (e.g., social or game, etc.) depending on how the application is used and/or the context in which the application is used.

In some embodiments, the computing device may be configured to generate or select an application-specific lookup table based on the static classifications. For example, in response to coarsely classifying the application as a "social" application based on the static classification operation, the computing device may select for use a lookup table includes values/columns that correlate usage information (e.g., whether the speaker is on, etc.) with activities such as text, chat, voice over IP (VOIP), video streaming, sharing of photos, live sharing, games, etc.

The computing device may be configured to perform dynamic classification operations (e.g., after the static classification operations are complete) to further classify the activity or types of activity of the software application based on usage or activation of various computing device resources. For example, the computing device may classify the current activity or types of activity of the application based on network usage information, such as the sockets that are used by the application, types or amounts of information communicated via uplink and/or downlink communication channels, the amount of bandwidth used, etc. Alternatively or in addition, the computing device may classify the current activity or types of activity of the application based on a combination of its static classification and its hardware usage characteristics, which may include sensor usage, speaker usage, microphone usage, front camera usage, back camera usage, processor usage, hardware block usage, system on chip (SOC) resource usage, global positioning system (GPS) circuitry usage, etc.

In some embodiments, the computing device may be configured to generate a coarse determination/classification of the current state of the application/device in an application classification layer based on metadata associated with a software application, generate a more granular determination or classification of the current state of the application/device in a state classification layer using information regarding computing device resources in use or activated by the software application using a lookup table selected based on the coarse determination or classification, and take an action based on the determined more granular determination or classification to improve the performance of the software application and/or computing device.

Various embodiments, enable a computing device to determine the current activities or state of a software application operating on the computing device without directly collecting information from the software application. This software activity or operating state information may then be used to adjust computing device services, functions or resources to better support the executing software application, thereby enhance application and computing device performance and thus improving the user experience.

Figure 1:
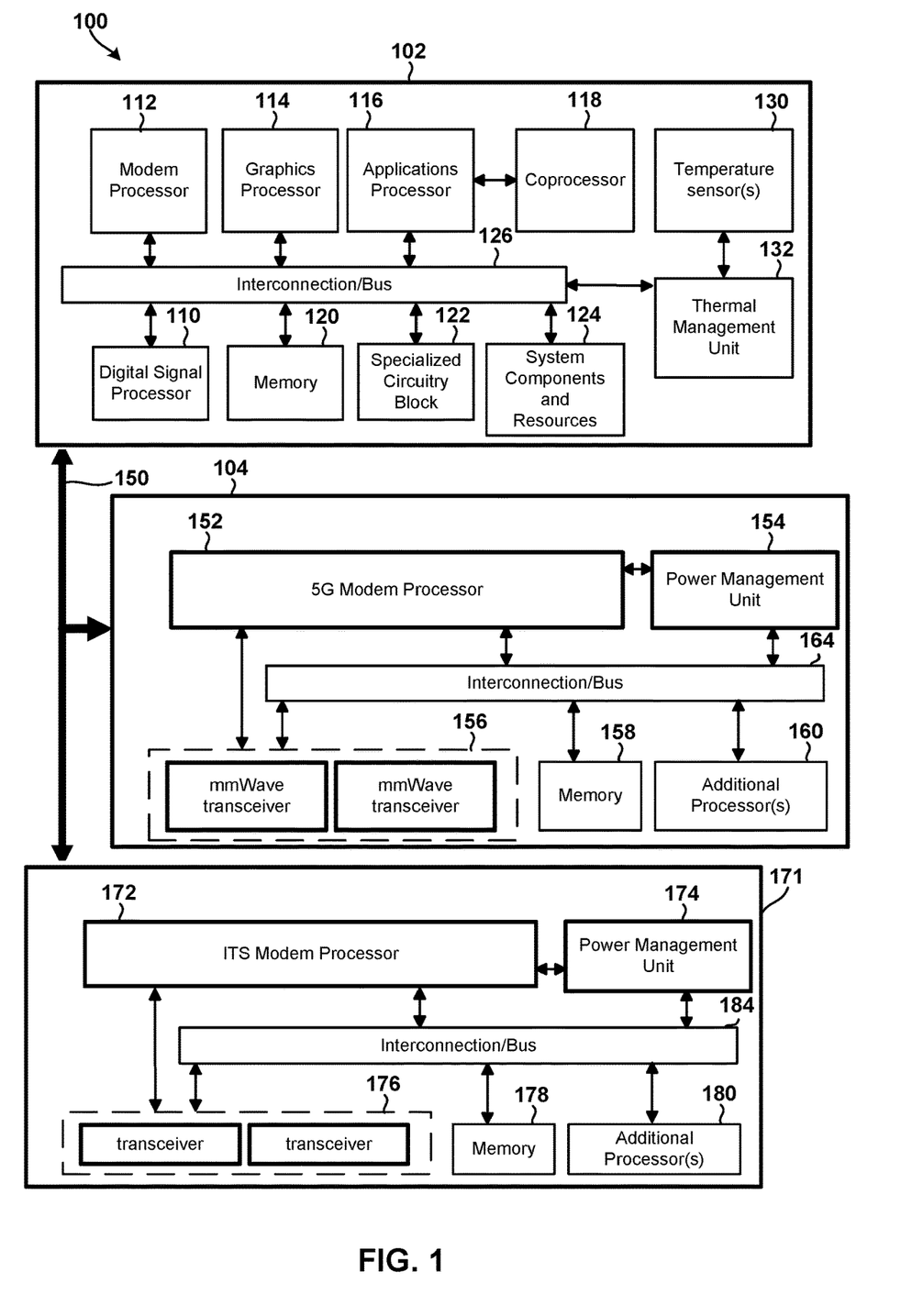
FIG. 1 is a block diagram of an example computing system that could be configured to implement the various embodiments.

The various embodiments may be implemented on a number of single processor and multiprocessor communication devices, including a system on chip (SOC) and/or a system in a package (SIP). FIG. 1 illustrates an example SIP 100 architecture that may be configured to implement some embodiments. The example SIP 100 architecture may be implemented in any SIP, and may be used in any communication device implementing various embodiments.

In the example illustrated in FIG. 1, the SIP 100 includes three SoCs 102, 104, 171. In some embodiments, the first SoC 102 may operate as a central processing unit (CPU) of the communication device that carries out the instructions of software application programs by performing the arithmetic, logical, control and input/output (I/O) operations specified by the instructions. In some embodiments, the second SoC 104 may operate as a specialized processing unit. For example, the second SoC 104 may operate as a specialized 5G processing unit responsible for managing high volume, high speed (e.g., 5 Gbps, etc.), and/or very high frequency short wave length (e.g., 28 GHz mmWave spectrum, etc.) communications to support 5G NR functionality with an air interface based on orthogonal frequency-division multiplexing (OFDM). In some embodiments, the third SoC 171 may operate as a specialized processing unit. For example, the third SoC 171 may operate as a specialized C-V2X processing unit responsible for managing V2V, V2I, and V2P communications over D2D links, such as D2D links establish in the dedicated ITS 5.9 GHz spectrum communications. The SoCs and organization of functionality illustrated in FIG. 1 are a non-limiting example of a SIP as other architectures and organizations of functionality among SoCs, including fewer or more SoCs, are contemplated.

In the example illustrated in FIG. 1, the first SoC 102 includes a digital Signal processor (DSP) 110, a modem processor 112, a graphics processor 114, an application processor 116, one or more coprocessors 118 (e.g., vector co-processor) connected to one or more of the processors, memory 120, specialized circuitry block or blocks 122, system components and resources 124, an interconnection/bus module 126, one or more temperature sensors 130, and a thermal management unit 132. The second SoC 304 includes a 5G modem processor 152, a power management unit 154, an interconnection/bus module 164, a plurality of mmWave transceivers 156, memory 158, and various additional processors 160, such as an applications processor, packet processor, etc. The third SoC 171 includes an intelligent transportation system (ITS) modem processor 172, a power management unit 174, an interconnection/bus module 184, a plurality of transceivers 176 (e.g., transceivers configured to operate in the dedicated ITS 5.9 GHz spectrum), memory 178, and various additional processors 180, such as an applications processor, packet processor, etc.

Each processor 110, 112, 114, 116, 118, 152, 160, 172, 180 may include one or more cores, and each processor/core may perform operations independent of the other processors/cores. For example, the first SoC 102 may include a processor that executes a first type of operating system (e.g., FreeBSD, LINUX, OS X, etc.) and a processor that executes a second type of operating system (e.g., MICROSOFT WINDOWS 10). In addition, any or all of the processors 110, 112, 114, 116, 118, 152, 160, 172, 180 may be included as part of a processor cluster architecture (e.g., a synchronous processor cluster architecture, an asynchronous or heterogeneous processor cluster architecture, etc.).

The first, second, and third SoCs 102, 104, 171 may include various system components, resources and custom circuitry for managing sensor Data, analog-to-digital conversions, wireless Data transmissions, and for performing other specialized operations, such as decoding Data packets and processing encoded audio and video signals for rendering in a web browser or other display application. For example, the system components and resources 124 of the first SoC 102 may include power amplifiers, voltage regulators, oscillators, phase-locked loops, peripheral bridges, Data controllers, memory controllers, system controllers, access ports, timers, and other similar components used to support the processors and software clients running on a wireless device. The system components and resources 124 and/or custom circuitry block 122 may also include circuitry to interface with peripheral devices, such as cameras, electronic displays, display systems, wireless communication devices, wired network interfaces, external memory chips, autonomous driving systems, vehicle bus interfaces, etc. Custom circuitry blocks 122 may be dedicated hardware within the SoC 102 configure to perform particular functions for managing operations of the system on chip (SOC) that would otherwise be performed by a programmable processor. For example, various embodiments many be implement partially or wholly in a custom circuitry block 122 configured with interconnections and dedicated a processor configured (e.g., configured in firmware) to perform at least some of the operations of the various embodiments as described herein.

The first, second, and third SoCs 102, 104, 171 may communicate via one or more interconnection/bus modules 150. The processors 110, 112, 114, 116, 118 may be interconnected to one or more memory elements 120, system components and resources 124, and custom circuitry 122, and a thermal management unit 132 via an interconnection/bus module 126. Similarly, the processors 152, 160 may be interconnected to the power management unit 154, the mmWave transceivers 156, memory 158, and various additional processors 160 via the interconnection/bus module 164. Similarly, the processors 172, 180 may be interconnected to the power management unit 174, the transceivers 176, memory 178, and various additional processors 180 via the interconnection/bus module 184. The interconnection/bus module 126, 150, 164, 184 may include an array of reconfigurable logic gates and/or implement a bus architecture (e.g., CoreConnect, AMBA, etc.). Communications may be provided by advanced interconnects, such as high-performance networks-on chip (NoCs).

The first, second, and/or third SoCs 102, 104, 171 may further include an input/output module (not illustrated) for communicating with resources external to the SoCs. Resources external to the SoCs may be shared by two or more of the internal SoC processors/cores.

In addition to the SIP 100 discussed above, the various aspects may be implemented in a wide variety of communication devices, which may include a single processor, multiple processors, multicore processors, or any combination thereof.

Figure 2A:
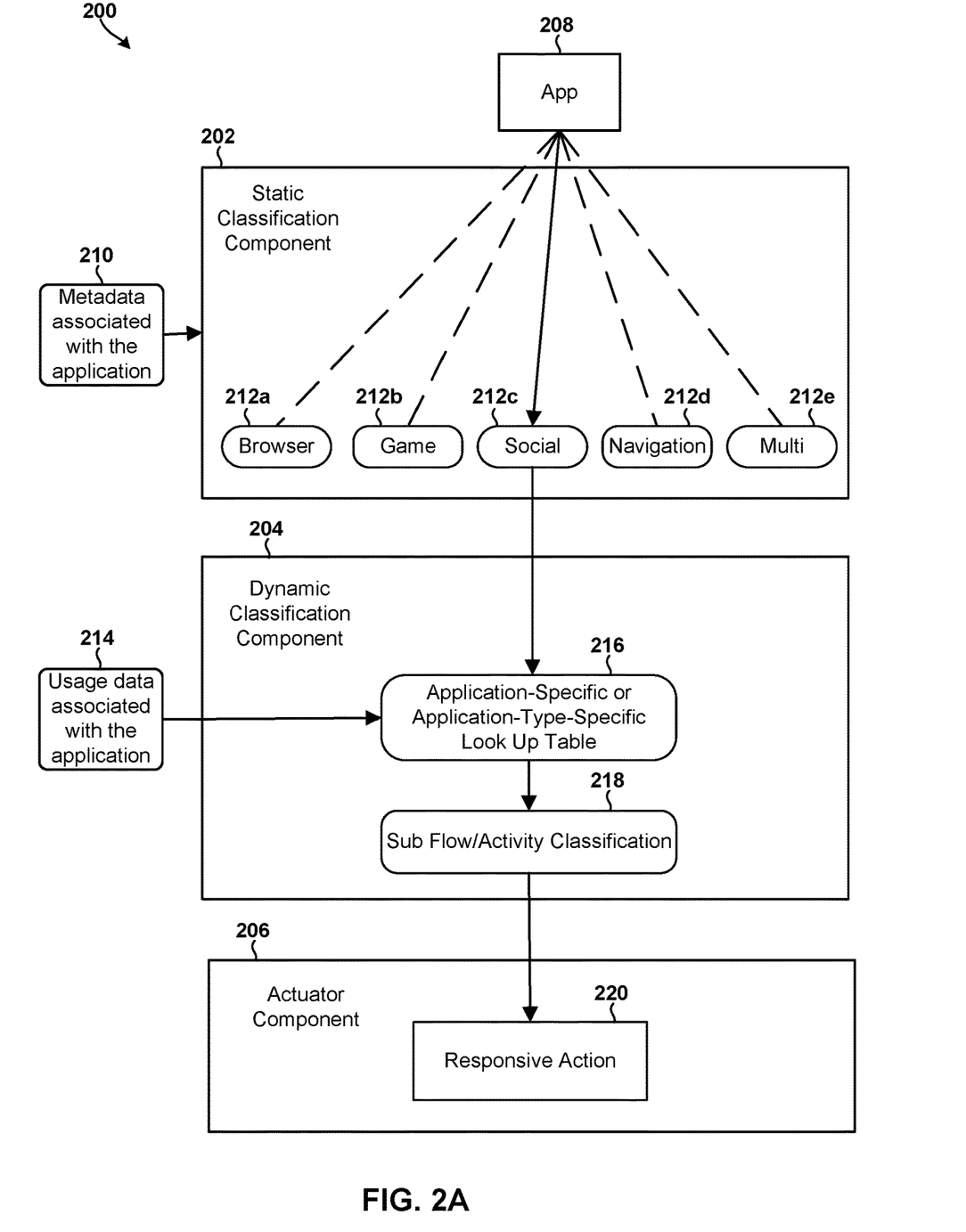
FIGS. 2A and 2B are block diagrams illustrating example components and operations in a computing system configured to classify sub flows/activities in accordance with some embodiments.

FIG. 2A illustrates components and operations of a computing system 200 configured to perform sub flow/activity classification in accordance with various embodiments. With reference to FIG. 2A, the computing system 200 may include a static classification component 202, a dynamic classification component 204, and an actuator component 206, any or all of which may operation in the user space of the operating system of the computing system 200 to perform the functions described below.

The static classification component 202 may collect metadata 210 associated with a software application 208 that is downloaded, installed or launched on the computing system 200. The metadata 210 may include application descriptions, images, video content, user comments, and other information that is available on an application download service, included as part of the application download package, or stored on files associated with the software application 208. The static classification component 202 may use the collected metadata 210 to classify or categorize the software application 208 into a category, such as a browser category 212a, game category 212b, social category 212c, navigation category 212d, or a multi category 212e. In the example illustrated in FIG. 2A, the static classification component 202 classifies/categorizes the software application 208 into the social category 212c.

The static classification component 202 may classify or categorize the software application 208 once (e.g., at installation, etc.), and this initial course categorization may be accessed or used by the computing system 200 each time the application is launched or executed on the computing system. That is, during or prior to application's runtime (e.g., prior to executing the functions of the software application, etc.), the computing system 200 may select an application-specific lookup table 216 based on the initial course category 212a-212e into which the software application 208 is classified/categorized.

The dynamic classification component 204 may continuously or repeatedly monitor the computing system 200 to collect usage data 214 associated with the execution of the software application 208 on the computing system 200. The collected usage data may include information indicating whether various sensors (e.g., speaker, microphone, GPS, front camera, rear camera, electronic display) or components (e.g., SOC hardware block video encoder/decoder, CPU, GPU, etc.) in the computing system 200 have been accessed or used by the software application 208 within a time period (e.g., within the preceding 2 minutes, etc.). The dynamic classification component 204 may apply the collected usage data 214 to the selected application-specific lookup table 216 to generate a sub flow/activity classification 218 for the software application 208 and/or to determine the dynamic activities of the software application 208.

The actuator component 206 may select and/or perform a responsive action 220 based on the sub flow/activity classification 218. For example, the actuator component 206 may cause the computing system 200 to perform various actions for better network selection or usage, improved network optimization, improved network slice selection, latency reduction, etc. based on sub flow/activity classification 218.

Figure 2B:
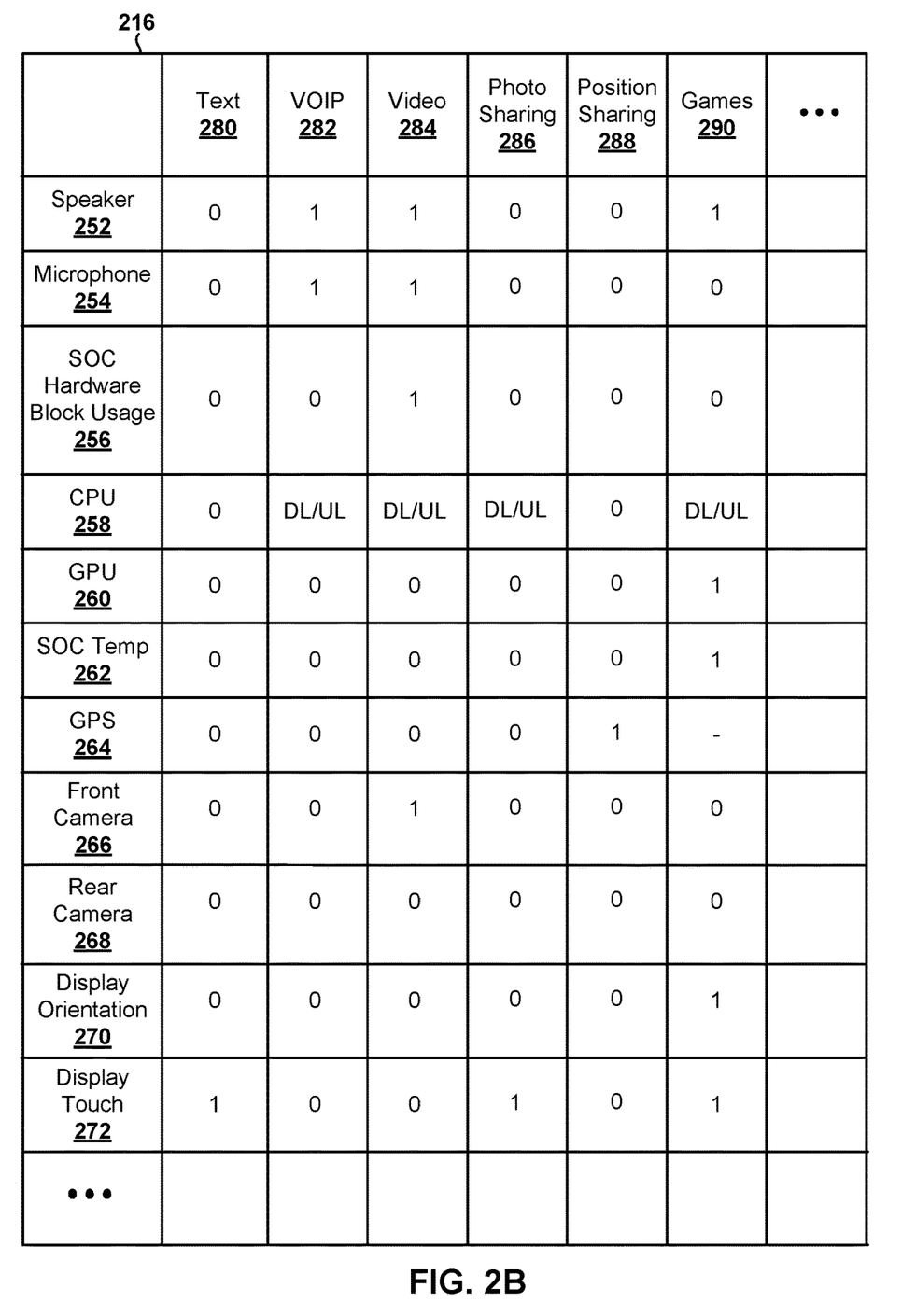

FIG. 2B illustrates an example application-specific lookup table 216 that includes information that maps or correlates various activated computing device resources (e.g., device hardware blocks, sensors, displays, user interface activity, software or hardware functions, etc.) of the computing system 200 to particular activities or types of activities or functionalities of the software application 208 that the specific application or application type is are capable of performing In the example illustrated in FIG. 2B, the application-specific lookup table 216 is an information structure that includes in a first column various computing device resources, including device hardware blocks, sensors, displays, user interface activity, software or hardware functions and in subsequent columns indicates a correlation (e.g., 0 if not correlated and 1 if correlated) to a particular type of activity (e.g., texting, VOIP, video, photo sharing, live sharing, games, etc.) identified in a first row. In the illustrated example, the activated device resources and their correlations to various activities or type of activities of the software application include a speaker 252 row (or record, k-tuple, n-tuple, vector, etc.), a microphone 254 row, a SOC hardware block usage 256 row, a CPU 258 row, a GPU 260 row, a system on chip (SOC) temp 262 row, a GPS 254 row, a front camera 266 row, a rear camera 268, a display orientation 270 row and a display touch 272 row. The application-specific lookup table 216 illustrates an example of how each of these device resources may correlate to texting in a text 280 column (or field, parameter, property, attribute, stanchion, etc.), VOIP communications in a VOIP 282 column, video presentation in a video 284 column, photo sharing in a photo sharing 286 column, live video streaming or sharing in a live sharing 288 column, and gaming in a games 290 column. The cells at the intersection of each row and column may store a string, symbol, numeric value or logic value (as illustrated in the example in FIG. 2B that provides a correlation between the activated device resource and each type of activity that may be performed by the software application for which the lookup table was generated. For example, a texting activity (280) may be correlated to just frequent display user interface touches (272), while a gaming activity 290 may be correlated to speaker use 252, uplink/downlink communications of a CPU (258), GPU use (260), elevated SOC temperature (262), a particular display orientation (270), frequent display user interface touches (272) etc.

In some embodiments, a processor of the computing system 200 may be configured to use the result of applying the string, symbol, numeric value or logic value in the cells in the application-specific lookup table 216 to decision rules and/or decision nodes to dynamically determine the current activity or type of activity of the software application 208 or a sub flow/activity classification 218. As an example, processor of the computing system 200 may monitor device resources to determine which resources are in use or activated by the software application, determine the string, symbol, numeric value or logic value correlation of each identified used or activated software application to each of the various activities or types of activities, and the determine from such correlation information a particular activity or type of activity or activities that is most likely occurring. Other lookup mechanisms may be used with such lookup tables and the data structure of the lookup table may vary based on the lookup process employed. For example, upon determining that the only active or in use device resource is the touch screen display, the processor may determine that the texting activity is most strongly correlated to the detected active device resources. Similarly, upon determining that the speaker is in use, uplink/downlink communications of a CPU are occurring, the GPU is in use, the SOC is exhibiting elevated temperature, the display has a particular orientation, and there are frequent touches on the display user interface touches, the processor may determine that a gaming activity is most strongly correlated to the detected active device resources.

Lookup tables (e.g., 216) may be generated by software developers based on their knowledge of the device resources that will be accessed or called by a particular application or type of application. Lookup tables may be stored in non-volatile memory (e.g., 120) for use at runtime and/or obtained via a remote data source, such as a remote server accessed via a wireless communication network.

Any form of lookup table that correlates active device resources to an activity (or activity type) may be used in various embodiments, and the claims are not intended to be limited to the two-dimensional data array structure illustrated in FIG. 2B. For example, a lookup table may have a linear structure that lists activities (activity types) that correlate with each active device resource or that lists the active device resources correlated to each activity (or activity type) of the specific. As another example, a lookup table may have a data structure of a fixed decision tree that that correlates active device resources to an activity (or activity type), or vice versa. Other data structure forms of lookup tables may be used as well.

Figure 3:
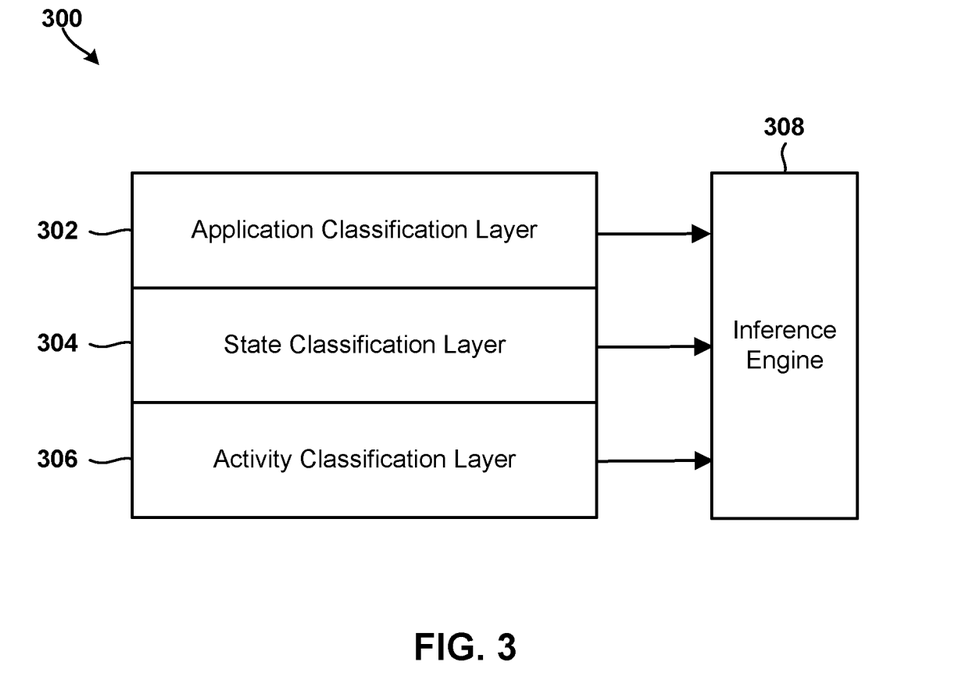
FIG. 3 is a block diagram illustrating components or layers in a computing system configured to perform inference in accordance with some embodiments.

FIG. 3 illustrates a sub flow/activity classification (SAC/SFC) framework 300 that could execute on a computing device (e.g., SIP 100, computing system 200, etc.) to provide an inference of the current state of an application or the device. The SAC/SFC framework 300 may include an application classification layer 302, a state classification layer 304, and an activity classification layer 306. Each layer 302-306 may be configured to provide information to an inference engine 308, which may use the received information to generate an overall inference determination. The overall inference determination may a correlation of information from the layers 302-306 that may be used by a variety of services or functions, such as to control the functioning of the device.

The application classification layer 302 may evaluate or analyze metadata, resource usage, and application data, and perform a coarse determination/classification of the activities and/or states of the application and/or device. Examples of such application type classifications include "browser application," "media player application," "media capable application," "social application," "navigation application," "gaming application," etc.

Figure 4:
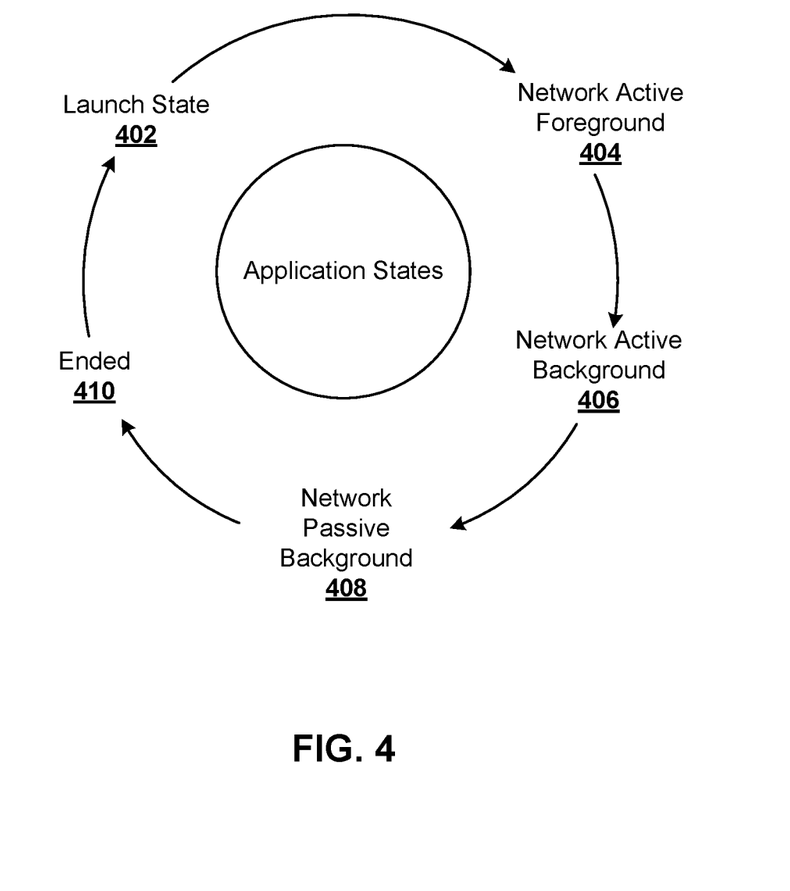
FIG. 4 is a state diagram illustrating example application states that could be monitored or evaluated by a computing system configured in accordance with the embodiments.

The state classification layer 304 may monitor the application state by evaluating or analyzing user interactions with the device (which puts the application in various states during the lifetime of the application), and perform a more granular determination/classification of the activities and/or states of the application and/or device than the application classification layer 302. The state classification layer 304 may effectively provide usage context for the application. Having a context to the current activity being performed by an application can be used to provide a better quality of experience (QoE). With reference to FIG. 4, example application states include a launch state 402, a network active foreground state 404, a network active background state 406, a network passive background state 408, and an ended state 410.

Returning to FIG. 3, the activity classification layer 306 may be configured to evaluate a variety of sensors or quarriable entities, and perform a finer or even more granular determination or classification of the activities and/or states of the application and/or device than the state classification layer 304. The activity classification layer 306 may provide information such as network stats, usage stats, media sessions/resource manager, audio recording/playback, camera information, GPU performance statistics, information from location-based services, user ID and Permissions, TSENS/Thermal information, proximity sensor outputs, device orientation, etc.

The inference engine 308 may be configured to receive and use information from any or all of the layers 302-306 to generate a system wide inference. In some embodiments, the system wide inference may be determined based on heuristics. In some embodiments, the system wide inference may include various different types of information, including any or all of a package name, time of inference, app type classification, attribute information, location information, and inference type.

An inference type may include information identifying the action an application and/or user is performing on the device, such as media video (e.g., media playback has been identified and the media type is video), media audio (e.g., media playback has been identified and the media type is audio), VOIP (e.g., an audio call has been identified), video call (e.g., a video call has been identified), nav motion (e.g., navigation application is actively rendering maps during motion), GPU-high (e.g., user is in game play phase with high GPU activity), upload (e.g., file/data upload in progress), and download (e.g., file/data download in progress).

The attribute information, which may include additional data received by the inference engine 308, may be used as properties to determine the state of the application, such as foreground (indicates context in which the application is running background/foreground), network (indicates the activity of the application when it is pushed to the background during user interaction but actively uploading/downloading information), proximity (indicates proximity information from the informer that other applications may find relevant with this inference), and orientation (this is a property to indicate orientation from the informer other applications may find relevant with this inference).

In some embodiments, the inference engine 308 may be configured to monitor various parameters to determine inferences regarding the current state of the computing device or the current state of a software application executing on the computing device. The inference engine 308 may determine the inferences without directly collecting information from the software application. The inference engine 308 may output the inference for use in taking a responsive action (e.g., selecting a low latency link, preforming network optimizations, etc.).

In some embodiments, the computing device may be configured to use any or all of the above described information from the inference engine 308 to provide inferences to other components or software applications, which may utilize the information to make decisions to improve on the services each provides. Examples of uses of the sub activity classification inferences include digital wellness applications (that help users live better), smart link management (to improve communication links to better service current application activities), and application fencing (limiting certain uses to predefined locations and times, such as child usage limitations).

Figure 5:
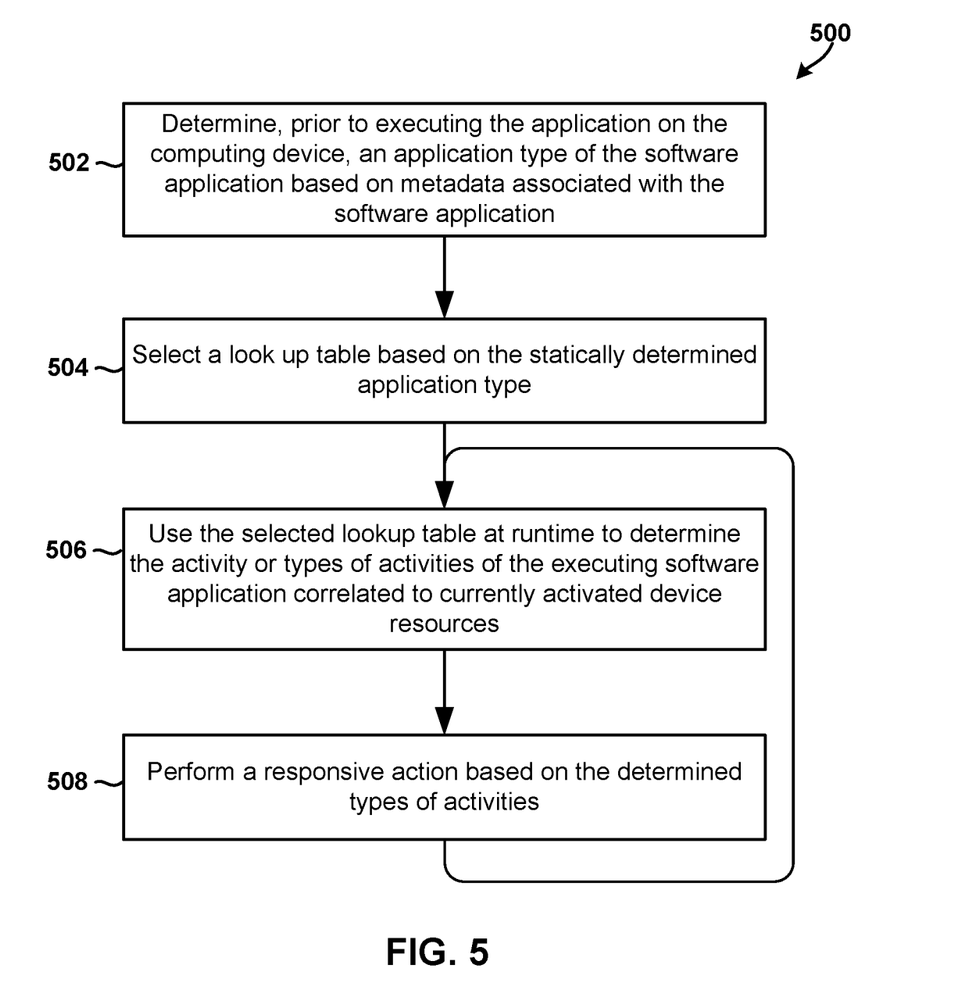
FIG. 5 is a process flow diagram illustrating a method for determining types of activities performed by a software application on a computing device in accordance with an embodiment.

FIG. 5 illustrates a method 500 of determining the types of activities that are performed by a software application operating on a computing device in accordance with an embodiment. The operations of method 500 may be performed by a processor (e.g., any of processors 110-118, etc.) and/or a specialized circuitry block or module (e.g., 122) in a computing device (e.g., SIP 100, computing system 200, 300, etc.). For ease of reference, the elements of the computing device performing operations of the method 500 are referred to as a "processor."

In block 502 of method 500, processor may determine an application type of the software application based on metadata associated with the software application. The processor may determine the application type statically, at installation, at launch, prior to executing the application on the computing device, and/or prior to performing the functions of the software application. The processor may determine an application type of the software application based on metadata that includes any or all of an application description, image, video, user comment, or other information that is available on an application download service, included as part of the application download package, or stored on files associated with the software application.

In block 504, the processor may select a lookup table based on the determined application type. The selected table may map or correlate at least one of a function, resource or sensor value to at least one functional activity of the software application. The selected table may also be an application-specific table that maps or correlates at least one of a function, resource or sensor value to at least one functional activity of a specific software application or software application type (e.g., WeChat, WhatsApp, social media application, browser, etc.).

In block 506, the processor may use the selected lookup table at runtime to determine the activity or types of activities of the executing software application correlated to currently activated device resources. For example, the computing device may repeatedly determine which of various device resources (e.g., network usage information, sensor usage information, hardware usage information, software usage information, and resources listed in FIG. 2B) are currently activated or in use by the software application, and use that information as lookup parameters in the lookup table to determine a most likely type of activity in which the software application currently engaged. This may involve monitoring the computing device hardware and software resources that software applications may utilize to collect usage information, and dynamically determine the type or types of activities presently being performed by the software application by applying the collected usage information to the selected lookup table. In block 506, the processor may determine the specific computing device resources to monitor based on the lookup table, such as only monitoring the device resources listed in the table or correlated to any activities.

In block 508, the processor may perform a responsive action based on the determined types of activities. For example, the processor may take an action or actions to better support currently executing functionality by adjusting internal system components and resources (e.g., 124) and/or adjusting an external resource, such as selecting a low latency link, preforming network optimizations, selecting a network slice, performing application fencing for GPS/navigation, and similar operations.

In various embodiments, the processor may repeat the operations of blocks 506 and 508 continuously, periodically or episodically to dynamically recognize and respond changes in application activities or functionality with responsive actions to better support current activities of the executing application. For example, the processor may continuously or repeatedly monitoring computing device resources activated or in use by the software application, and dynamically determining the activity or types of activities of the executing software application by continuously or repeatedly applying the computing device resources activated or in use by the software application to the selected lookup table to identify the activity or types of activities correlated to the activated computing device resources.

As noted above, in some embodiments the operations of the method 500 may be performed in part by a programmable processor, such as an application processor (e.g., 116), and in part by dedicated circuitry, such as a specialized circuitry block (e.g., 122). For example, application-related operations (e.g., blocks 502, 504 and 508) may be performed by an application or control processor (e.g., 112, 116) while monitoring of activities of various computing device resources in block 506 may be performed by specialized circuitry block (e.g., 122).

As noted above, in some embodiments, the processor may select a network slice (e.g., in block 508, etc.) based on the determined types of activities. In some embodiments, the processor may select a network slice based on coarse application classification and/or sub flow/activity classification. That is, network slices may be defined for a software application (App) and/or coded within the App. In these embodiments, the processor could request an URLLC slice from the network for a time-sensitive procedure/App, and request an eMBB slice from 5G network function for a higher throughput procedure/App. The processor may negotiate the network slice with a network function based on application developer logic.

In some embodiments, the sub flow/activity classification may allow the processor to request an optimal or near-optimal network slice without any hardcoded application logic. For example, based on activity detection within a software application operating on the device, the processor may select and use a gaming application eMBB slice during game upgrades (a high throughput procedure) and a URLLC during game play (a time-sensitive procedure).

In some embodiments, the processor may be configured to use sub-flow/activity classification for system selection in handoffs. That is, early deployments of 5G NR network may include a network coverage hole that could result in ping ponging between 4G and 5G NR networks. Similarly, a handoff from 5G standalone (SA) mode to 5G non-stand-alone (NSA) may cause disruptions in the quality of service (QoS) associated with a software application. The handoff latency may be in the scale of multiple seconds, and the processor may change Internet protocol (IP) addresses and/or require additional negotiation at upper layers. Any or all of these conditions may cause a disruption in service or QoS issues. Such disruptions and/or QoS issues may be particularly relevant for streaming and/or voice over IP (VOIP) applications in which the transition occurs between a 4G network and a 5G NR network (particularly between 4G-5G SA mode). The sub flow/activity classification could allow the processor to provide the network profile and QoS needs of the application to a System Selection Algorithm (SSA) to make a choice between a right bearer network (e.g., NR NSA, NR SA, LTE, etc.) and a right frequency (e.g., mmWave, sub 6, optimal E-UTRA Absolute Radio Frequency Channel Number (EARFCN), etc.).

In some embodiments, the processor may be configured to use sub-flow/activity classification to dynamically determine the dynamic power consumption characteristics of the mobile device, or a software application operating on the mobile device. The processor may start or stop the thermal daemon apriori, scale hardware clocks, and/or perform other similar operations based on the determined power consumption characteristics. For example, some processors may be configured to start a thermal engine daemon when the temperature reaches a certain value. In conventional solutions, the launching and operation of the thermal engine daemon may be based on a lookup table (LUT), and not on the dynamic characteristics or usage of a software application on the device. In some embodiments, the processor may use the sub-flow/activity classification to determine or predict power consumption characteristics of a software application, and determine whether to start the thermal engine daemon and/or whether to perform thermal mitigation operations based on the determined or predicted power consumption characteristics. Similarly, for power usage, the processor may use the sub-flow/activity classification to granularly predict the power consumption characteristics of a software application operating on the device based on application states and/or to take apriori actions. For example, the processor may prevent select actions within an application, give warning to the end user that an action consumes power too fast, notify the user that the remaining time of the battery would be N seconds, or perform other similar operations based on the determined or predicted power consumption characteristics.

In some embodiments, the processor may be configured to use sub-flow/activity classification to control or adjust (e.g., increase or decrease) hardware-based clocks (e.g., clocks associated with the double data rate (DDR) memory/bus, graphics processing unit (GPU), etc.), display backlight intensity, audio volume, and/or audio latency based on the sub flow/activity classification. As an example, the processor may be configured to use sub flow/activity classification to determine when game play is active, and increase the backlight of display and/or run one or more hardware clocks at the turbo speeds in response to determining that game play is active.

In some embodiments, a processor associated with an advanced driver-assistance systems (ADAS) may be configured to use sub-flow/activity classification to determine application states, driving states, or other similar conditions, activities or events. The processor may restrict certain content types in the front infotainment system and/or in the rear infotainment system based on the determined application states, driving states, etc.

In some embodiments, the processor may be configured to use sub-flow/activity classification to classify content (e.g., video, audio, text, gaming, etc.) consumed by the user. Any or all objectional material could be selected, depending on the type of content. For example, in response to detecting video playback, the processor may search a video frame for blacklisted material. In response to detecting audio content, the processor may search for select keywords.

Figure 6:
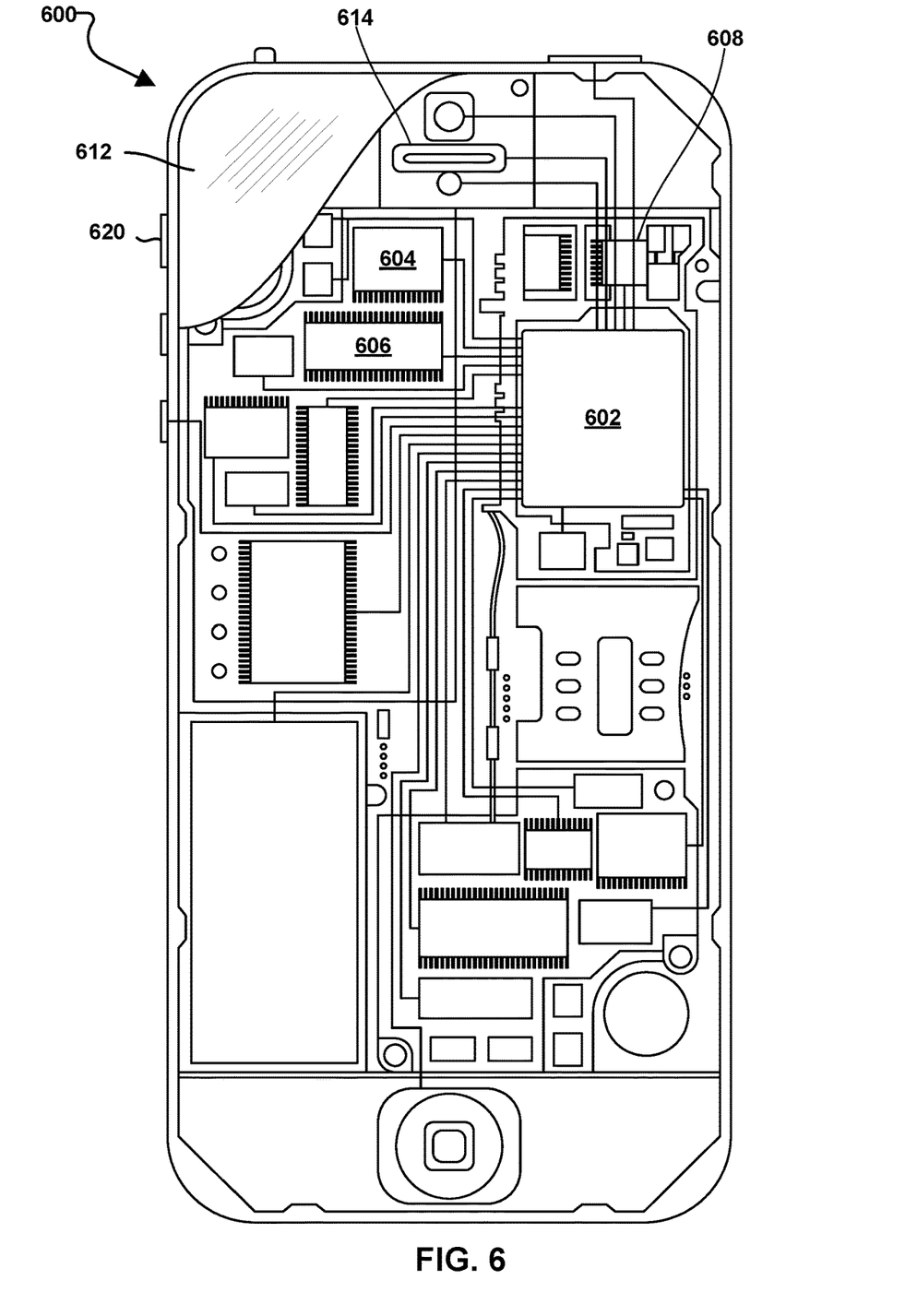
FIG. 6 is a component block diagram of a mobile device suitable for use in an aspect.

The various aspects may be implemented on a variety of computing devices, an example of which is illustrated in FIG. 6 in the form of a smartphone. A smartphone 600 may include a processor 602 coupled to internal memory 604, a display 612, and to a speaker 614. Additionally, the smartphone 600 may include an antenna for sending and receiving electromagnetic radiation that may be connected to a wireless data link and/or cellular telephone transceiver 608 coupled to the processor 602. Smartphones 600 typically also include menu selection buttons or rocker switches 620 for receiving user inputs.

A typical smartphone 600 also includes a sound encoding/decoding (CODEC) circuit 606, which digitizes sound received from a microphone into data packets suitable for wireless transmission and decodes received sound data packets to generate analog signals that are provided to the speaker to generate sound. Also, one or more of the processor 602, wireless transceiver 608 and CODEC 606 may include a digital signal processor (DSP) circuit (not shown separately).

The processors 602 may be any programmable microprocessor, microcomputer or multiple processor chip or chips that can be configured by software instructions (applications) to perform a variety of functions, including the functions of the various aspects described below. In some mobile devices, multiple processors 602 may be provided, such as one processor dedicated to wireless communication functions and one processor dedicated to running other applications. Typically, software applications may be stored in the internal memory 604 before they are accessed and loaded into the processor 602. The processor 602 may include internal memory sufficient to store the software application instructions.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments may be implemented in processor-executable instructions or program code for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Processor-executable instructions stored on a processor-readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

Various functions and operations of the embodiments described herein may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of determining types of activities performed by a software application on a computing device, comprising:
    determining an application type of the software application prior to executing the software application on the computing device based on metadata associated with the software application;
    selecting a lookup table based on the determined application type;
    using the selected lookup table at runtime to determine activities or types of activities of the executing software application correlated to currently activated device resources; and
    performing a responsive action based on the determined activities or types of activities.

2. The method of claim 1, wherein selecting the lookup table based on the determined application type comprises:
    selecting a table that maps or correlates at least one of a function, resource or sensor value to at least one functional activity of the software application.

3. The method of claim 1, wherein selecting the lookup table based on the statically determined application type comprises:
    selecting an application-specific table that maps or correlates at least one of a function, resource or sensor value to at least one functional activity of a specific software application.

4. The method of claim 1, wherein selecting the lookup table based on the statically determined application type comprises:
    selecting an application-specific table that maps or correlates at least one of a function, resource or sensor value to at least one functional activity of a specific type of software application.

5. The method of claim 1, wherein determining the application type of the software application prior to executing the software application on the computing device based on metadata associated with the software application comprises statically determining the application type based on metadata received from an application download service.

6. The method of claim 1, wherein using the selected lookup table at runtime to determine the activities or types of activities of the executing software application correlated to currently activated device resources comprises:
    continuously or repeatedly monitoring computing device resources activated or in use by the software application; and
    dynamically determining the activities or types of activities of the executing software application by continuously or repeatedly applying the computing device resources activated or in use by the software application to the selected lookup table to identify the activities or types of activities correlated to the activated computing device resources.

7. The method of claim 6, wherein continuously or repeatedly monitoring the computing device resources activated or in use by the software application comprises continuously or repeatedly monitoring one or more of network usage, activated sensors, activated display functions, user interface device usage, speaker activation, microphone activation, central processor unit activity, graphics processor activity, or software usage information.

8. The method of claim 1, wherein performing the responsive action based on the determined activity or types of activities comprises one or more of selecting a low latency link, preforming network optimizations, selecting a network slice, or performing application fencing.

9. A computing device, comprising:
    a processor configured with processor-executable instructions to:
        determine an application type of a software application prior to executing the software application on the computing device based on metadata associated with the software application;
        select a lookup table based on the determined application type;
        use the selected lookup table at runtime to determine activities or types of activities of the executing software application correlated to currently activated device resources; and
        perform a responsive action based on the determined activities or types of activities.

10. The computing device of claim 9, wherein the processor is further configured with processor-executable instructions to select the lookup table based on the determined application type by selecting a table that maps or correlates at least one of a function, resource or sensor value to at least one functional activity of the software application.

11. The computing device of claim 9, wherein the processor is further configured with processor-executable instructions to select the lookup table based on the determined application type by selecting an application-specific table that maps or correlates at least one of a function, resource or sensor value to at least one functional activity of a specific software application.

12. The computing device of claim 9, wherein the processor is further configured with processor-executable instructions to select the lookup table based on the determined application type by selecting an application-specific table that maps or correlates at least one of a function, resource or sensor value to at least one functional activity of a specific type of software application.

13. The computing device of claim 9, wherein the processor is further configured with processor-executable instructions to determine the application type of the software application prior to executing the software application on the computing device based on metadata associated with the software application by statically determining the application type based on metadata received from an application download service.

14. The computing device of claim 9, wherein the processor is further configured with processor-executable instructions to use the selected lookup table at runtime to determine the activities or types of activities of the executing software application correlated to currently activated device resources by:
continuously or repeatedly monitoring computing device resources activated or in use by the software application; and
dynamically determining the activities or types of activities of the executing software application by continuously or repeatedly applying the computing device resources activated or in use by the software application to the selected lookup table to identify the activities or types of activities correlated to the activated computing device resources.

15. The computing device of claim 14, wherein the processor is further configured with processor-executable instructions to continuously or repeatedly monitoring the computing device resources activated or in use by the software application by continuously or repeatedly monitoring one or more of network usage, activated sensors, activated display functions, user interface device usage, speaker activation, microphone activation, central processor unit activity, graphics processor activity, or software usage information.

16. The computing device of claim 9, wherein the processor is further configured with processor-executable instructions to perform the responsive action based on the determined activity or types of activities by one or more of selecting a low latency link, preforming network optimizations, selecting a network slice, or performing application fencing.

17. A non-transitory computer readable medium having stored thereon processor-executable software instructions configured to cause a computing device processor to perform operations comprising:
determining an application type of a software application prior to executing the software application on the computing device processor based on metadata associated with the software application;
selecting a lookup table based on the determined application type;
using the selected lookup table at runtime to determine activities or types of activities of the executing software application correlated to currently activated device resources; and
performing a responsive action based on the determined activities or types of activities.

18. The non-transitory computer readable medium of claim 17, wherein the stored processor-executable instructions are configured to cause a computing device processor to perform operations such that selecting the lookup table based on the determined application type comprises:
selecting a table that maps or correlates at least one of a function, resource or sensor value to at least one functional activity of the software application.

19. The non-transitory computer readable medium of claim 17, wherein the stored processor-executable instructions are configured to cause a computing device processor to perform operations such that selecting the lookup table based on the statically determined application type comprises:
selecting an application-specific table that maps or correlates at least one of a function, resource or sensor value to at least one functional activity of a specific software application.

20. The non-transitory computer readable medium of claim 17, wherein the stored processor-executable instructions are configured to cause a computing device processor to perform operations such that selecting the lookup table based on the statically determined application type comprises:
selecting an application-specific table that maps or correlates at least one of a function, resource or sensor value to at least one functional activity of a specific type of software application.

21. The non-transitory computer readable medium of claim 17, wherein the stored processor-executable instructions are configured to cause a computing device processor to perform operations such that determining the application type of the software application prior to executing the software application on the computing device processor based on metadata associated with the software application comprises statically determining the application type based on metadata received from an application download service.

22. The non-transitory computer readable medium of claim 17, wherein the stored processor-executable instructions are configured to cause a computing device processor to perform operations such that using the selected lookup table at runtime to determine the activities or types of activities of the executing software application correlated to currently activated device resources comprises:
continuously or repeatedly monitoring computing device resources activated or in use by the software application; and
dynamically determining the activities or types of activities of the executing software application by continuously or repeatedly applying the computing device resources activated or in use by the software application to the selected lookup table to identify the activities or types of activities correlated to the activated computing device resources.

23. The non-transitory computer readable medium of claim 22, wherein the stored processor-executable instructions are configured to cause a computing device processor to perform operations such that continuously or repeatedly monitoring the computing device resources activated or in use by the software application comprises continuously or repeatedly monitoring one or more of network usage, activated sensors, activated display functions, user interface device usage, speaker activation, microphone activation, central processor unit activity, graphics processor activity, or software usage information.

24. The non-transitory computer readable medium of claim 17, wherein the stored processor-executable instructions are configured to cause a computing device processor to perform operations such that performing the responsive action based on the determined activity or types of activities comprises one or more of selecting a low latency link, preforming network optimizations, selecting a network slice, or performing application fencing.

25. A computing device, comprising:
means for determining an application type of a software application prior to executing the software application on the computing device based on metadata associated with the software application;

means for selecting a lookup table based on the determined application type;
means for using the selected lookup table at runtime to determine activities or types of activities of the executing software application correlated to currently activated device resources; and
means for performing a responsive action based on the determined activities or types of activities.

\* \* \* \* \*